Oct. 28, 1947.  J. J. NEFF  2,429,891
ELECTRICALLY RESPONSIVE GAGING MECHANISM FOR ASSORTING BEARING BALLS
Filed Aug. 7, 1944  5 Sheets-Sheet 3

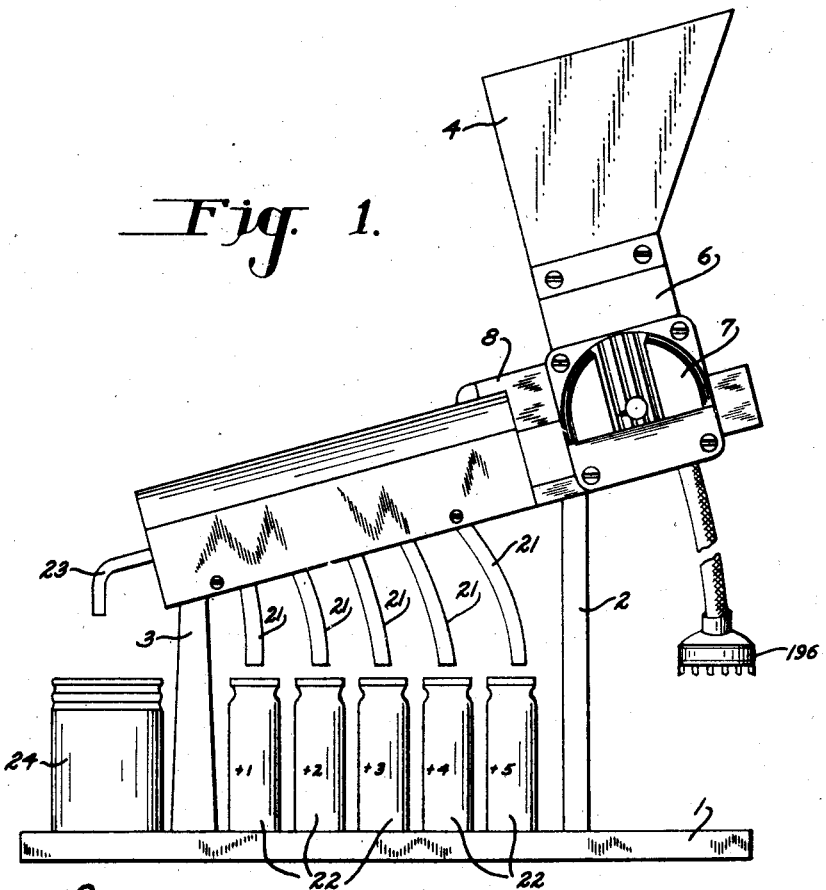
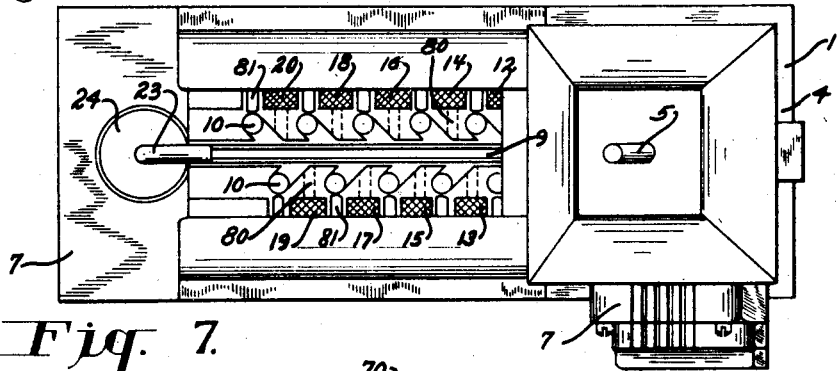
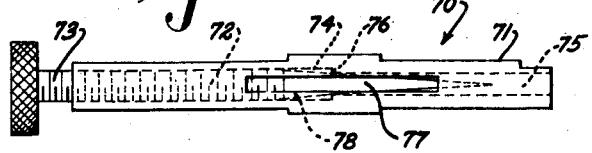

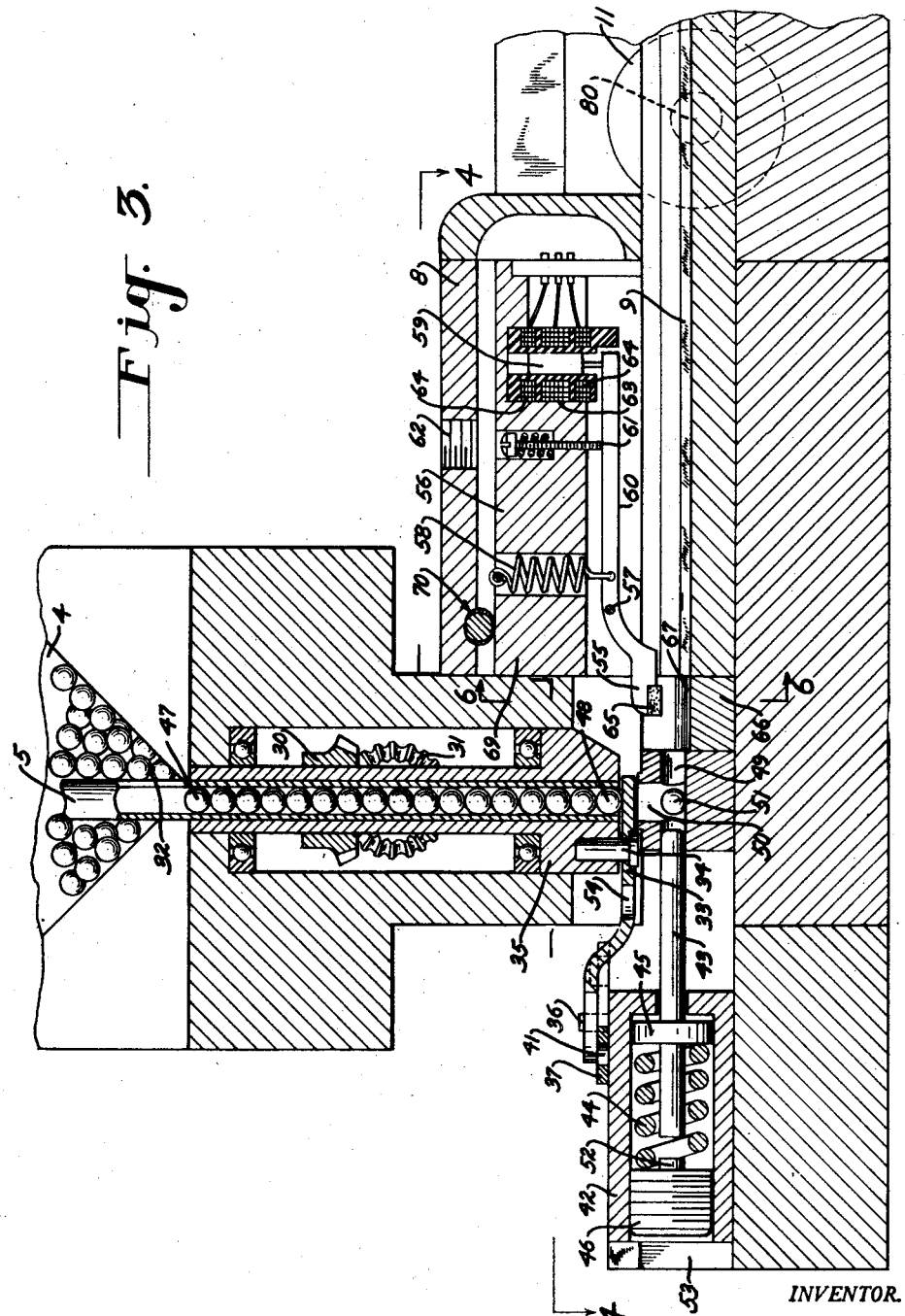

INVENTOR.
JOSEPH J. NEFF.
BY
ATTORNEY

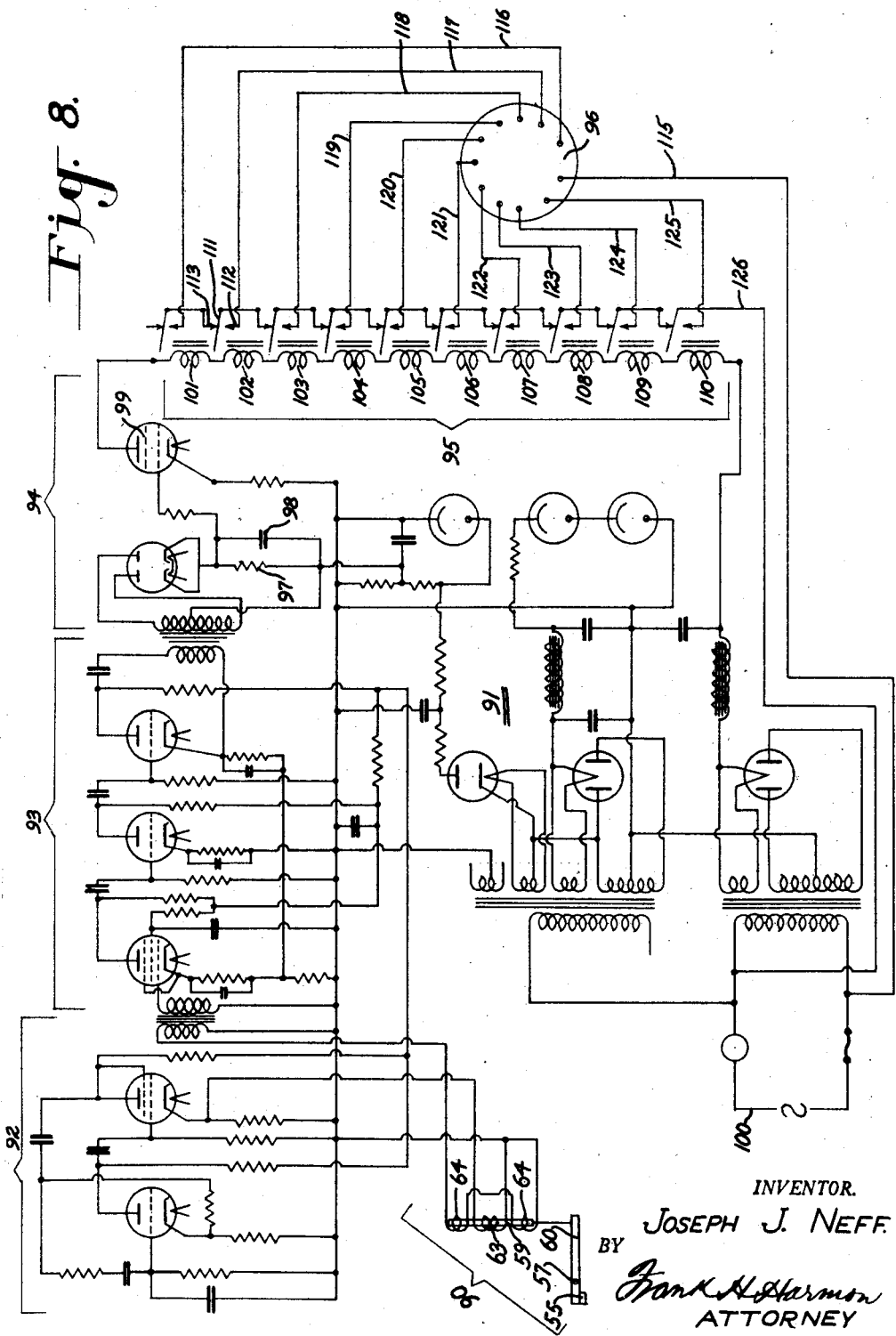

Patented Oct. 28, 1947

2,429,891

UNITED STATES PATENT OFFICE 2,429,891

ELECTRICALLY RESPONSIVE GAGING MECHANISM FOR ASSORTING BEARING BALLS

Joseph J. Neff, South Euclid, Ohio, assignor, by mesne assignments, to Jack & Heintz Precision Industries, Inc., Cleveland, Ohio, a corporation of Delaware Application August 7, 1944, Serial No. 548,397

13 Claims. (Cl. 209—88)

1

This invention relates to an apparatus for sorting spherical objects, such as ball bearings and the like, according to size.

The general object of the invention is to provide an automatic device for measuring and sorting ball bearings and the like with a high degree of precision, whereby balls of different sizes may be segregated into groups of different sizes. More particularly the object of the invention is to provide a feeding mechanism which will feed ball bearings, one at a time, into an electrical measuring device which is operative through relays to energize a particular one of a number of ball diverting solenoids in accordance with the measured diameter of each ball to classify and discharge the balls into separate containers according to size.

A preferred embodiment of the invention will now be described in connection with the accompanying drawings in which:

Figure 1 is a side elevational view of a sorting device constructed according to the present invention;

Figure 2 is a plan view;

Figure 3 is a partial longitudinal sectional view through the feeding and measuring mechanism;

Figure 4 is a view taken on the line 4—4 of Figure 3 illustrating the feeding plunger in retracted position;

Figure 5 is a fragmentary view taken as Figure 4 but showing the feeding plunger in advanced position;

Figure 6 is a partial cross-sectional view taken on the line 6—6 of Figure 3;

Figure 7 is a view of the adjusting screw for the electrical pick-up;

Figure 8 is a wiring diagram of the measuring and relay circuits; and

Figure 9:
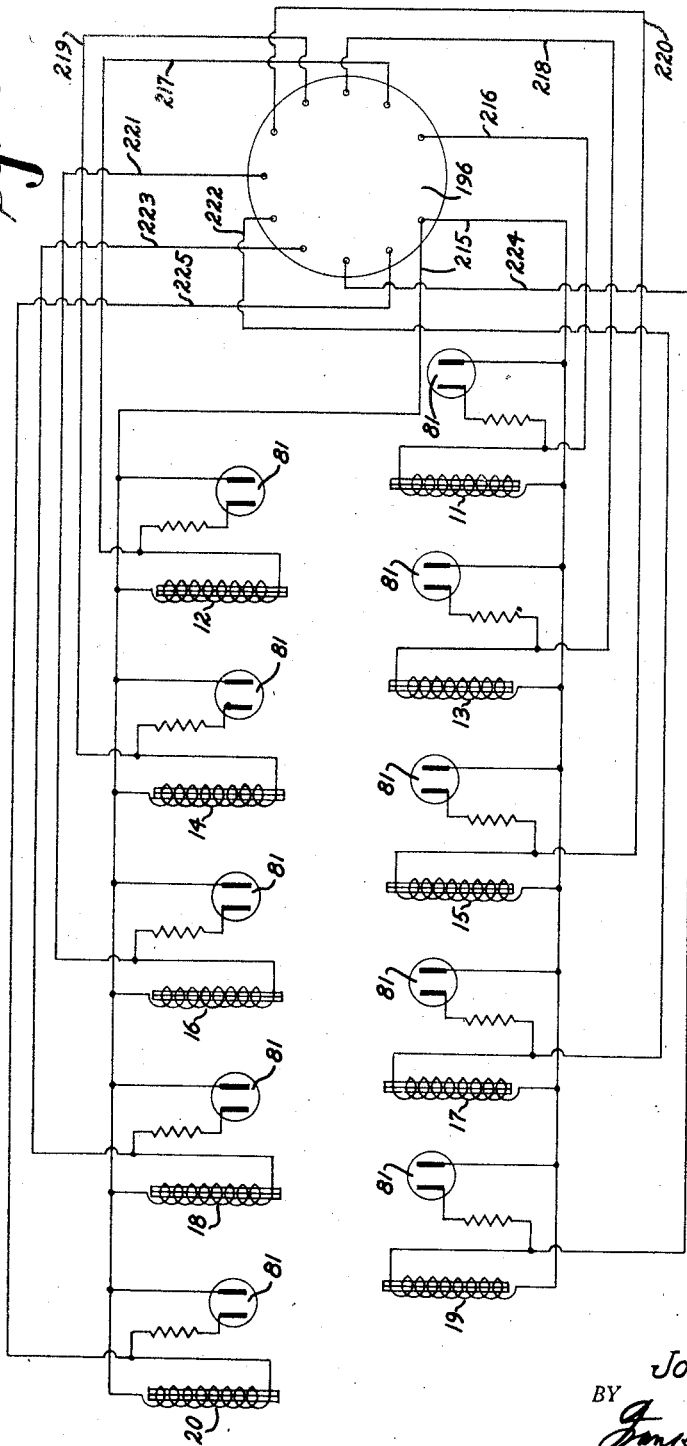
Figure 9 is a wiring diagram of the solenoid circuits.

Referring first to the general views of the device shown in Figures 1 and 2, the mechanical parts of the sorting mechanism are carried by a base 1 provided with standards 2 and 3. The balls to be sorted are deposited in a hopper 4 containing an upstanding rotary feed tube 5 leading down to a feeding mechanism 6 powered by an electric motor 7. The feeding mechanism operates to feed the balls, one at a time, through an electrical measuring device 8 from whence they are allowed to run down an inclined trough 9.

The measuring device 8 is operative through electrical circuits presently to be described to energize one of the solenoids 11 to 20 in accordance with the measured diameter of a particular ball to divert that ball out of the trough 9 and into one of a plurality of side channels 10 leading to individual descending tubes 21. Each of the tubes 21 leads to a separate container 22 on the base 1. If a ball on its course down channel 9 is not diverted into any of the side channels 10, it continues on its path through a tube 23 leading to a container 24. Thus, the mechanism shown in Figures 1 and 2, together with its associated electrical system, is adapted to take balls from the hopper 4, one by one, measure them and classify them in groups, the present embodiment being operative to classify ten such groups within the predetermined tolerance range. Balls not falling in any of these 10 classifications pass through the machine into the container 24 for rejection.

Referring now to the mechanical details of the feed mechanism shown in Figures 3 to 5, the feed tube 5 is seen to carry a bevel gear 30 meshing with a motor driven gear 31. The upper end of the feed tube 5 extends into the hopper 4 and is provided with an opening 32 for admission of balls, the central location of the tube within the hopper serving as an agitator to keep the balls from packing around the opening. As the tube 5 revolves it will fill with balls as shown in Figure 3 with the lowermost ball resting upon a connecting arm 33 which is driven by a crank pin 34 carried by an enlarged head 35 on the lower end of the tube. An end of the connecting arm 33 is coupled by a pin connection 36 with a connecting lever 37 pivoted at 38 on a base block 39. The connecting lever 37 is provided at its free end with a slot engaging a pin 41 on a slide 42. The slide 42 carries a plunger 43 urged into extended position by means of a spring 44 bearing against a collar 45 on the plunger and backed up by a screw plug or the like 46.

When the parts are in the positions shown in Figures 3 and 4, the column of balls 47 in the feed tube 5 rests upon a lowermost ball 48 riding on the connecting arm 33. After the feed tube 5 rotates through a half turn from the position of Figures 3 and 4, the parts will be in the position shown in Figure 5, wherein it is seen that a ball pass opening 54 in the arm 33 is aligned beneath the tube 5, and the plunger 43 is extended through an opening 49 leading out of a ball chamber 50, the column of balls 47 then resting on the top side of plunger 43. In this position, the plunger will have moved a previously dropped ball 51 from the ball chamber 50, as shown in Figure 3, into measuring position beneath a sensitive finger 55 in the electrical measuring device. The height of the chamber 50 is such that when the plunger 43 is extended therethrough, as shown in Figure 5, there is room for only one ball between the top of the plunger and the connecting arm 33. Thus when the parts again return to the position of Figures 3 and 4 the end of the feed tube 5 will be covered by the connecting arm 33 and the plunger 43 will have been retracted so as to allow the lowermost ball of the column, which is resting thereon, to drop to the bottom of the chamber 50. In Figure 3, then, the ball 51 has just dropped off the end of the plunger and is in a position to be pushed through the opening 49 into measuring position beneath the sensitive measuring finger 55 upon the next advance of the plunger.

The measuring finger 55 is resiliently urged downwardly so as to engage a ball thereunder with sufficient force to require the compression of spring 44 in order to push a ball past the finger. In the operation of pushing the ball 51 beneath the sensitive finger 55, the spring 44 is therefore compressed until the back end of plunger 43 engages a stop 52 on the plug 46, whereupon the ball is forcibly ejected from beneath the sensitive finger and into the trough 9, the spring 44 producing an initial impetus to the ball after its momentary pause beneath the measuring finger. Slide 42 is seen to be mounted for reciprocation in a guide 53, the motion of the plunger 43 being governed by the motion of the slide and the resistance encountered by the plunger whereby it can pause in its forward motion until it is engaged by the stop 52 in the manner described.

The electrical measuring device heretofore referred to generally by the numeral 8 comprises an electrical pick-up embodied in a housing 56. The sensitive measuring finger 55 constitutes one end of a lever 60 pivoted at 57 and having a spring 58 and an armature 59 connected therewith. The spring 58 pulls the inner end of the lever 60 upwardly against an adjustable stop 61 which is arranged for screw-driver adjustment through an opening 62. The armature 59 is arranged for longitudinal movement within a plurality of coils comprising a driving coil 63 and a pair of pick-up coils 64.

The end of the sensitive finger 55 is provided with a hardened, wear-resisting ball-engaging portion 65 adapted to frictionally engage the top surface of the ball under the action of the spring 58 with sufficient force to cause the spring 44 to be compressed behind the plunger 43 in the manner previously described in order to make each ball pause momentarily for measuring before ejection into the trough 9. Beneath the sensitive finger 55 and between the opening 49 and the trough 9 is a hardened steel supporting block 66 having a V-shaped ball supporting surface 67, the sides of which are disposed at an angle of approximately 150° as best shown in Figure 6.

The housing member 56 carrying the sensitive finger 55 and the coils 63 and 64 is supported and secured at its lower end by a pair of resilient ears 68, shown in Figure 4, which tend to raise the upper end 69 of the housing. The position of the upper end 69 is accurately adjusted and maintained by a sensitive adjusting means indicated generally by the numeral 70. The adjusting means 70 comprises a sleeve 71 having a threaded portion 72 receiving a special adjusting screw 73. As shown in Figure 7, the threaded portion 72 becomes a smooth bore in the region 74, changing to a bore 75 of reduced diameter with an annular shoulder 76 at the transition point between the two diameters. The sleeve 71 is split or slotted at 77 to allow for expansion of the central portion when a tapered portion 78 on the screw 73 is adjusted into the sleeve so as to spread the shoulder portion 76. Lateral spreading of the central part of the sleeve 71 in this manner adjusts the position of the end 69 of the pick-up housing 56 to slightly raise or lower the sensitive finger 55 with respect to the ball supporting block 66. The thread 72 is very fine and the taper 78 is very gradual, whereby a very sensitive adjustment is obtained.

The structure shown in Figure 3 is supported on an incline as shown in Figure 1, so that when a ball is given a push past the sensitive finger 55 under the impetus of the compressed spring 44, it will roll down the trough 9 at a brisk rate. If none of the solenoids 11 to 20 become energized, the ball will continue in the trough 9 and proceed through the tube 23 into the reject jar 24. Each of the solenoids is provided with an iron core 80 terminating flush with the beginning of the side wall of each side channel 10, the arrangement being such that sufficient attraction is exerted by an energized solenoid coil to cause a descending ball to be pulled over the side of the trough 9 and into a side channel 10. The momentum of the ball then carries it past the end of the core 80 and into the appropriate tube 21 without halting. A neon lamp 81 is associated with each of the solenoids to indicate which solenoid is energized, the flashing of a lamp thereby indicating the particular side channel into which the ball is being diverted.

The electrical system for measuring and classifying the balls in the manner described is illustrated in Figures 8 and 9. Numeral 90 refers to the electrical pick-up wherein the reference numerals applied to the sensitive finger and the electrical coils correspond to the numerals used in Figure 3. That portion of the system associated with the power supply, voltage regulators, etc., is designated by the numeral 91, the numeral 109 indicating a source of alternating current from which the whole system derives its power. The numeral 92 indicates an oscillator circuit for the driving coil 63 and the numeral 93 indicates a bank of amplifiers for amplifying the signal from the pick-up coils 64. The components 90, 91, 92 and 93 of this system correspond generally to the system disclosed and claimed in my copending application, Serial No. 497,087, filed August 2, 1943.

The numeral 94 indicates a rectifier and delay circuit interposed between the signal amplifier 93 and a bank of sorting relays 95 which control the energization of the diverting solenoids 11 to 20. Two important elements of the rectifier and delay circuit 94 are the resister 97 and the parallel condenser 98. When a ball passes beneath the sensitive finger 55, disturbing the electrical balance between the coils 64, the amplified signal from the pick-up charges the condenser 98 to a potential bearing a definite relation to the strength of the signal. The potential of the charged condenser 98 controls the grid potential in a D. C. amplifier 99, this grid being normally sufficiently negative to substantially cut off the plate current through the relays. The presence of a signal charging the condenser 98 makes the control grid 99 less negative thus increasing the plate current through the relays. Upon removal of the signal, the condenser 98 thereupon discharges through the resister 97 at a rate governed by the time constant of the combination.

The sorting relays 101 to 110 are set to pull in at different current values and to drop out at the same current value, and must allow time for a ball to travel to the last solenoid before the circuits are de-energized. This timing function is therefore accomplished and determined by the above-mentioned time constant of the condenser-resister combination to maintain the energization of the selected solenoid after the signal from the pick-up has been removed. The time interval between pull in and drop out is approximately the same for each relay, although the first solenoid 11 obviously does not require quite as long an interval of energization as the most remote solenoid 20.

The value of the current in sorting relays 101 to 110 depends upon the peak voltage to which the condenser 98 is charged and this value in turn depends, as stated, upon the strength of the amplified signal received from the pick-up. These relays are adjusted progressively so that relay 101 operates with the lowest value of pull-in current and relay 110 requires the largest value of pull-in current of the group. Each of the relays is provided with an armature 111 adapted to engage a front contact 112 when energized and a back contact 113 when not sufficiently energized. A plug connector 96 leading to the solenoids 11 to 20 is wired with a common return 115 and wires 116 to 125 connected with the front contacts of the respective relays. The back contact of each relay is connected with the armature of the next relay in the manner shown.

Thus, it is seen that the arrangement is such that only one solenoid can be energized from a given signal. If, for instance, the signal produces a relay current sufficient to pull in the armatures of relays 101 through 105, but is not sufficient to operate the remaining relays, the circuit from wire 126 will include the back contacts of relays 110, 109, 108, 107 and 106 to the wire 120 which will be the only one energized in the connector 96 for making a circuit with the return wire 115. In a similar manner, regardless of the number of relays which are actuated on a given signal, only the last relay will energize a circuit to its solenoid.

Figure 9 illustrates the wiring diagram for the solenoids 11 to 20 and neon lamps 81 shown in Figure 2, and completes the system shown in Figure 8. These elements are connected with the control system shown in Figure 8 by means of a plug connector 196 adapted to be connected with the connector 96 so that wires 215 to 225, inclusive, of Figure 9 are connected with wires 115 to 125, respectively, in Figure 8, whereby all of the components shown in Figure 8, except the pick-up 90, may be contained in a separate cabinet. For clarity in the wiring diagram the pick-up connections are not included in the plug connectors 96, 196, although it is understood that the pick-up is physically associated with the components of Figure 9 rather than the components of Figure 8.

This separation of the power supply, oscillator, amplifier, rectifier and delay circuit and sorting relays from the mechanical structure is merely for convenience in the preferred embodiment as these circuit elements may just as well be contained within an enlarged base or other portion of the structure of the sorting machine. Referring to Figures 2, 8 and 9, it will be seen that the first solenoid 11 is energized by the first relay 101 and that the remaining solenoids along the trough 9 are connected in sequence to the respective relays in Figure 8, the last solenoid 20 being energized by the last relay 110. Each time a ball passes beneath the measuring finger 55 one of the neon lamps 81 indicates by its flashing which one of the solenoids has been energized to divert that particular ball.

If the balls to be sorted are not sufficiently magnetic, other diverting means such as gates or plungers may be employed to physically intercept the rolling ball for sorting purposes, such means being actuated or controlled by electromagnetic operators corresponding to the present solenoids.

In a sorting machine constructed in the manner illustrated and described, the rate of ball travel from the sensitive finger 55 to the last solenoid 20 is such that the condenser 98 may be discharged and all the relays cleared in preparation for the next signal in a time interval permitting the passage of about one ball a second through the machine, and the speed of the ball feeding mechanism is so adjusted. Obviously the speed of travel of the ball between the sensitive finger 55 and the last solenoid may be made either faster or slower, and the time constant of the condenser and resister combination 98—97 and the speed of the feeding mechanism may be appropriately coordinated to sort at either a slower or faster rate. It is always necessary, however, to maintain energization of the selected solenoid circuit until the ball has passed the energized solenoid, which requires in the present system that all relays remain energized a sufficient time for the ball to arrive at the most remote solenoid.

The function of the delay circuit may be accomplished by other specific means. For instance, the relays may have a retarded release characteristic or they may be provided with latching means releasable by a timing circuit or by the ball feeding mechanism. Alternatively, the whole timing function may be mechanically controlled by the feeding mechanism so that the period of solenoid actuation will be positively determined thereby.

To calibrate the machine, a plurality of precision master balls of a known size are run through and the adjusting means 70 is adjusted to deliver all of these balls without exception into a predetermined one of the containers 22. Then, successive batches of master balls of different sizes may be run through the machine and if the sorting relays are properly adjusted, each size will be sorted into a different one of the containers 22, each container receiving one size within prescribed tolerance limits exclusively. Balls smaller than the smallest size acceptable by the sorting relays or larger than the largest size acceptable by the sorting relays will pass through the machine and into the container 24. Thus, in the present embodiment, all the balls which are suitable for use are classified into ten different sizes and the remainder are rejected. The system may obviously be extended to accept larger and smaller balls beyond the range of the present system and either more or fewer classifications may be provided within the same over-all range. The machine works automatically without attention from an operator except to fill the hopper 4 with balls to be sorted from time to time and to remove and replace containers 22 as they become filled.

Various changes may be made in the construction and arrangement of parts and it is to be understood all such modifications are included in the invention, the same being limited only by the scope of the appended claims.

I claim:

1. A ball sorting machine comprising a ball hopper, gauging means, a plurality of diverting means responsive to said gauging means for classifying balls according to predetermined sizes, a ball chamber adjacent said gauging means, a resilient plunger arranged to push a ball out of said ball chamber and through said gauging means into a discharge path associated with said diverting means, a feed tube leading from said hopper to a point above said ball chamber, power means for rotating said feed tube, an enlarged head on the end of said feed tube, an apertured connecting arm pivotably connected with an eccentric pin on said head, said connecting arm being arranged to reciprocate said plunger when said head revolves, said arrangement being such that when said plunger is retracted by said connecting arm, said connecting arm covers the end of said feed tube to prevent the discharge of balls therefrom and when said plunger is advanced to push a ball out of said ball chamber the aperture in said connecting arm becomes aligned with said feed tube to drop a ball into said ball chamber above said plunger.

2. A ball sorting machine having gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, power mechanism arranged to feed balls one at a time through said gauging means, a gravity trough for receiving balls discharged from said gauging means, solenoid means disposed along opposite sides of said trough so as to divert balls out of said trough when said means are energized, side channels associated with said solenoids for receiving balls diverted thereby, a plurality of separate containers for receiving balls from said respective side channels, and means controlled by the gauging means for energizing said solenoids selectively in accordance with the ball diameter measured by said gauging means for sorting said balls.

3. In a ball sorting machine, gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, an oscillator circuit for energizing said driving coil, an amplifying circuit for amplifying the signal received from said pickup coils, a plurality of sorting relays connected in series and having different values of pull-in current, a delay circuit for momentarily maintaining said relays energized in accordance with the signal received from said amplifier, and a plurality of solenoids selectively energized by said relays and arranged for sorting balls as they are discharged from said gauging finger and classifying them in accordance with the signal originated by said pick-up coils.

4. In a ball sorting machine, gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, a plurality of solenoids for attracting said balls into different channels for sorting purposes, a plurality of sorting relays selectively operated by said gauging means for energizing one of said solenoids each time a ball is presented to said gauging means, and means associated with said relays for maintaining the energization of said solenoids while said ball is traveling from said gauging means.

5. In a ball sorting machine, gauging means, means to feed balls one at a time through said gauging means and into a gravity discharge trough, a plurality of solenoids disposed along opposite sides of said trough, and means controlled by said gauging means for energizing one of said solenoids in accordance with the ball diameter measured by said gauging means for attracting a descending ball laterally out of said trough and into a side channel.

6. In a ball sorting machine, gauging means, means for feeding balls one at a time through said gauging means and into a gravity discharge trough, a plurality of side channels adjacent but not connected with said trough, a solenoid associated with each of said side channels to attract a ball out of said trough when the solenoid is energized, and means controlled by said gauging means for energizing said solenoids selectively in accordance with the ball diameter measured by said gauging means.

7. In a ball sorting machine, gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, means for feeding balls one at a time through said gauging means and into a gravity discharge outlet, a plurality of side channels associated with said discharge outlet, a solenoid associated with each of said side channels and adapted when energized to attract a ball from said gravity outlet into said side channel, and means controlled by said gauging means for energizing said solenoids selectively in accordance with the ball diameter measured by said gauging means.

8. In a ball sorting machine, gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, means for feeding balls one at a time through said gauging means, means for producing an electric signal in accordance with the ball diameter measured by said gauging means, a condenser, means for charging said condenser to a potential determined by the strength of said signal, a plurality of diverting solenoids in the path of balls discharged from said gauging means, means responsive to said condenser potential for selectively energizing one of said solenoids, and a resistance for discharging said condenser, the time constant of said condenser and resistance combination on discharge being sufficient to maintain said selected solenoid energized while said ball is traveling from said gauging means.

9. In a ball sorting machine, gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, means to feed balls one at a time through said gauging means, means for producing an electric signal in accordance with the ball diameter measured by said gauging means, a plurality of solenoids for diverting balls from said gauging means into separate channels, a plurality of sorting relays for energizing said solenoids, an energizing circuit for said sorting relays, a condenser arranged to be charged to a potential determined by said signal, means for controlling the current in said sorting relays in accordance with the potential of said condenser, and a resistance for discharging said condenser, the time constant of said condenser and resistance combination on discharge being sufficient to maintain the energization of said relays while the gauged ball is traveling from said gauging means.

10. In a ball sorting machine, gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, means for feeding balls one at a time through said gauging means, means to produce an electric signal in accordance with the ball diameter measured by said gauging means, a plurality of diverting solenoids arranged to divert gauged balls into separate channels, a plurality of sorting relays connected with said solenoids respectively, a common circuit for energizing all said relays, a condenser, means for charging said condenser to a potential determined by said signal, means for energizing said common relay circuit with a current proportional to said condenser potential, and a resistance for discharging said condenser to deenergize said relays.

11. In a ball sorting machine, gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, means to feed balls one at a time through said gauging means, means for producing an electric signal in accordance with the ball diameter measured by said gauging means, a plurality of diverting solenoids for diverting gauged balls into separate channels, a condenser arranged to be charged to a potential in accordance with said signal, means for selectively energizing a predetermined one of said diverting solenoids in accordance with said condenser potential, and a resistance for discharging said condenser to deenergize said energized solenoid after a predetermined time interval.

12. In a ball sorting machine, gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, means to feed balls one at a time through said gauging means, means to produce an electric signal in accordance with the ball diameter measured by said gauging means, a plurality of diverting solenoids arranged to divert gauged balls into separate channels, a plurality of relays for energizing said respective solenoids, said relays being set to pull in at different current values, a common energizing circuit for said relays, and means for controlling the current in said circuit in accordance with said signal.

13. In a ball sorting machine, gauging means comprising an electrical displacement pickup mechanism for measuring the diameters of balls presented thereto, one by one, said pickup mechanism including a driving coil and two pickup coils, said pickup coils being mounted on either side of said driving coil and coaxial therewith, an armature mounted centrally of said coils for movement longitudinally therein, a gauging finger carried by said armature and flexibly and pivotally mounted to engage said balls, one at a time, means to feed balls one at a time through said gauging means, means to produce an electric signal in accordance with the ball diameter measured by said gauging means, a plurality of diverting solenoids arranged to divert gauged balls into separate channels, a plurality of relays actuatable by variable current values under the control of said signal for energizing said respective solenoids, said relays being set to pull in at different current values, and an interlocking circuit between said relays and said solenoids arranged so that at intermediate values of current effecting actuation of only a portion of said relays the actuated relay having the largest required pull-in current for energizing its diverting solenoid will prevent the remaining relays from energizing their respective solenoids so that only one solenoid will be energized by said signal.

JOSEPH J. NEFF.

REFERENCES CITED

The following references are of record in the file of this patent:

UNITED STATES PATENTS

| Number | Name | Date |
|---|---|---|
| 1,722,751 | Jones | July 30, 1929 |
| 2,085,671 | Powers | June 29, 1937 |
| 1,961,892 | Raymond | June 5, 1934 |
| 2,312,357 | Odquist | Mar. 2, 1943 |
| 2,303,526 | Cummings | Dec. 1, 1942 |
| 2,051,695 | Glacy | Aug. 18, 1936 |
| 2,000,403 | Maul | May 7, 1935 |
| 2,344,217 | Reason | Mar. 14, 1944 |
| 2,150,440 | Hargreaves | Mar. 14, 1939 |
| 2,392,856 | Martinec | Jan. 15, 1946 |